Patented Nov. 12, 1940

2,220,906

UNITED STATES PATENT OFFICE 2,220,906

DRYING OIL

Otto Jordan, Mannheim, and Ernst Rossmann, Ludwigshafen-on-the-Rhine, Germany, assignors, by mesne assignments, to General Aniline & Film Corporation, New York, N. Y., a corporation of Delaware No Drawing. Application January 31, 1939, Serial No. 253,802. In Germany February 3, 1938

3 Claims. (Cl. 134—56)

The present invention relates to drying oils.

Oiticica oil has, as is known, properties similar to China-wood oil. Films therefrom similarly to wood oil films, tend to form wrinkles by reason of the drying first occurring only on the surface and, in spite of great drying energy, oiticica oil requires a considerable time in order to dry through hard in a uniform manner.

We have now found that the properties of oiticica oil can be considerably improved by reacting it with a semicarbazide, i. e. semicarbazide itself or substituted semicarbazides, as for example thiosemicarbazide and aminoguanidine. For this purpose the oiticica oil may be dissolved for example in an organic solvent and treated with semicarbazide or a mixture of a semicarbazide salt and a basic substance capable of setting free the semicarbazide, as for example a mixture of semicarbazide hydrochloride and sodium acetate, at ordinary or slightly elevated temperature. A solution of semicarbazide, for example in chloroform, may also be added to the oil or the oil may be stirred with solid semicarbazide hydrochloride and sodium acetate. In the latter case a longer reaction time is of course necessary. By using dilute aqueous solutions of semicarbazide hydrochloride and sodium acetate, there are obtained by powerful stirring dispersions or emulsions of the improved oil. For the purpose of more rapid and better emulsification, wetting and emulsifying agents or also organic solvents may be co-employed as solvent assistants.

The initial materials for the reaction may be either pure oiticica oil or also an oil which has already been heated for some time and has thereby lost its original salve-like nature and has become from mobile to viscous similar to stand oil. Mixtures of oiticica oil with other drying oils or lacquer components may also be treated with semicarbazides.

During the reaction, the semicarbazide reacts with the keto group of the oiticica oil. The amount of semicarbazides theoretically calculated from the keto group may be used, but a considerable improvement in the properties of the oil is already obtained even with smaller amounts. The by-products formed in some cases during the reaction, as for example sodium chloride, are preferably removed with water if their presence is troublesome in the further working up.

The oils thus treated have a more or less viscous nature depending on whether untreated oil or oil which has already been subjected to a heat treatment is used. They also have a considerably greater drying speed and a capacity for drying through more uniformly than the untreated oils. Contrasted with the untreated oils, they may be used alone for the preparation of rapidly-hardening coatings. These acquire quite a high scratch hardness even after drying for a few hours.

The improved oiticica oils are soluble in benzine hydrocarbons, oil of turpentine and other usual lacquer solvents and also mix with other drying oils, oil lacquer bodies, oil-soluble synthetic resins, drying alkyd resins and also highly polymerized substances, as for example nitrocellulose, chloro-rubber and some polyvinyl compounds. They may therefore also be worked up together with the said substances or used as additions to lacquers from the above mentioned substances. Additions of the said kind usually still further increase the drying speed, improve the through drying, yield a still better scratch hardness and in many cases cause a specially high stability to water. Generally speaking, it is preferable to carry out such mixings at room temperature or at only moderately elevated temperatures because oiticica oil which has been treated with semicarbazide changes at about 150° C. and is thereby impaired in its properties. The improved oils may also be worked up with pigments, soluble dyestuffs, fillers and the like in the same way as other drying oils.

Coating agents prepared from the oiticica oil treated according to this invention may be used on a great variety of bases. They may be allowed to dry at room temperature or also at elevated temperatures up to about 120° C.

The improved oils are also suitable for primings, priming or knifing compositions, as impregnants and varnishes, for lining substances and the like.

The following examples will further illustrate how this invention may be carried out in practice, but the invention is not restricted to these examples. The parts are by weight.

Example 1

100 parts of oiticica oil are dissolved in 200 parts of diethylene glycol monoethyl ether, 30 parts of semicarbazide hydrochloride and 22 parts of sodium acetate are added and the mixture stirred for 2 days. Water is then added, the improved oiticica oil thereby separating. If desired, a water-insoluble solvent for the improved oiticica oil, as for example toluene, may be added for the purpose of better separation. The oil may then either be freed from solvent by distillation or the resulting solution may be directly used after the addition of siccatives, as for example lead or cobalt naphthenate, for coating purposes. The films obtained dry in a very short time with especially great hardness.

*Example 2*

100 parts of oiticica standoil, prepared by 10 minutes' heating of oiticica oil at 270° C., is dissolved in 100 parts of ethyl ether and 135 parts of polyglycol monoethyl ether, whereupon 25 parts of semicarbazide and 30 parts of sodium acetate are added to.

After agitating the mixture for 24 hours the oiticica standoil-semicarbazone is separated as a thick oil by the addition of water. The said oil, after being freed of ether by heating, constitutes a ready binder for varnishes which for painting purposes may be further diluted with solvents. A varnish coating from the said binder, after 8 days' drying, showed an elastic scratching hardness, of 250 grams (after the method of "Zeitschrift für angewandte Chemie," 50, 855 (1937), whereas a coating from untreated oiticica standoil showed a scratching hardness of 100 grams.

What we claim is:

1. A drying oil comprising a semicarbazone of oiticica oil.
2. A drying oil comprising a semicarbazone of thickened oiticica oil.
3. Drying oils comprising a semicarbazone of oiticica oil admixed with other drying oils.

OTTO JORDAN.
ERNST ROSSMANN.